(12) United States Patent
Mojica et al.

(10) Patent No.: US 8,527,986 B1
(45) Date of Patent: Sep. 3, 2013

(54) SYSTEM AND METHOD FOR AUTOMATED IDENTIFICATION OF AN APPLICATION OUT-OF-SYNCHRONIZATION CONDITION

(75) Inventors: Efren C. Mojica, Overland Park, KS (US); James C. Swift, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 868 days.

(21) Appl. No.: 12/698,684

(22) Filed: Feb. 2, 2010

(51) Int. Cl.
*G06F 9/445* (2006.01)

(52) U.S. Cl.
USPC .......................................... 717/178; 717/174

(58) Field of Classification Search
USPC .................................................. 717/174, 178
See application file for complete search history.

(56) References Cited

U.S. PATENT DOCUMENTS

| 2005/0114826 A1* | 5/2005 | Barthram ...................... 717/100 |
| 2005/0268299 A1* | 12/2005 | Picinich et al. ............... 718/100 |
| 2006/0277231 A1* | 12/2006 | Kral et al. ..................... 708/102 |
| 2007/0028216 A1* | 2/2007 | Boss et al. ..................... 717/124 |
| 2009/0239587 A1* | 9/2009 | Negron et al. ................. 455/566 |
| 2010/0241903 A1* | 9/2010 | Goldszmidt et al. ............ 714/38 |

* cited by examiner

*Primary Examiner* — Li B Zhen
*Assistant Examiner* — Hang Pan (57) ABSTRACT

A method of identifying a problem with a mobile application, comprising an emulation application initiating execution of a mobile application, the emulation application providing an execution environment that simulates a portable communication device in which the mobile application executes, wherein the emulation application is stored in a memory and executed by a processor of a computer; the emulation application detecting that the mobile application has self-reinstalled twice in succession; and the emulation application, based on detection of successive reinstallations, transmitting notification to an application store that the mobile application has self-reinstalled twice in succession.

20 Claims, 6 Drawing Sheets

SYSTEM AND METHOD FOR AUTOMATED IDENTIFICATION OF AN APPLICATION OUT-OF-SYNCHRONIZATION CONDITION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices may contain downloadable content such as applications. A mobile application may be one or more software components that collaborate to provide a functionality to the mobile device such as a calculator program, a web browser, a calendar program, or other. These applications may be revised from time to time by fixing bugs, adding features, improving performance, and/or other changes. When changes are made, the applications may be distributed as new versions. Applications may exist in more than one version at a given location.

SUMMARY

In an embodiment, a method of identifying a problem with a mobile application is disclosed. The method comprises an emulation application initiating execution of a mobile application, and the emulation application providing an execution environment that simulates a portable communication device in which the mobile application executes, wherein the emulation application is stored in a memory and executed by a processor of a computer; the emulation application detecting that the mobile application has self-reinstalled twice in succession; and the emulation application, based on detection of successive reinstallations, transmitting notification to an application store that the mobile application has self-reinstalled twice in succession. The method further comprises an administrator communicating with the organization that developed the mobile application to overcome the mobile application problem.

In an embodiment, a system of identifying outdated mobile applications is disclosed. The system comprises a computer having a memory, a processor, a data store containing a plurality of mobile applications, each mobile application associated with a source of the mobile application, and an application stored in the memory that, when executed by the processor, emulates an execution environment of a portable communication device, executes at least some of the plurality of mobile applications in the emulated execution environment of the portable communication device, detects that one of the mobile applications self-reinstalls from the data store two times successively, and transmits notification to an administrator associated with the data store indicating that one of the mobile applications that self-reinstalled two times and that is stored by the data store is not synchronized with the source of one of the mobile applications.

In an embodiment, a system of identifying outdated mobile applications is disclosed. The system comprises a computer having a memory and a processor, a data store containing a plurality of mobile applications, each mobile application associated with a source of the mobile application, and a plurality of applications stored in the memory, wherein each application, when executed by the processor, emulates an execution environment of a different portable communication device, executes at least some of the mobile applications in the emulated execution environment of the portable communication device, and wherein at least one of the applications detects that one of the mobile applications self-reinstalls from the data store two times successively, and transmits notification to an administrator associated with the data store indicating that the one of the mobile applications that self-reinstalled two times and that is stored by the data store is not synchronized with the source of one of the mobile applications. These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an embodiment, a system and method are disclosed that provide a means of determining if a mobile application distributed by a mobile service provider is unsynchronized with the version deemed appropriate by the originators of the mobile application. The system and method employ a mobile device emulation program operating on a computer system to execute mobile applications in order to verify version synchronization between originators of mobile applications and mobile service providers. The mobile device emulation program may systematically and/or periodically execute a process of verifying and/or testing any/all of the mobile applications that the mobile service provider makes available to its customers, in order to identify and correct issues that may lead to negative customer experiences associated with mobile applications that are out-of-synchronization.

Mobile service providers allow agents outside of their purview to produce mobile applications for distribution by the mobile service provider. This may lead to a situation where version control of these third-party mobile applications becomes more difficult than it may be in the case of traditional in-house mobile application production, for example mobile application production by mobile phone manufacturers and/or by mobile communication service providers. These third-party mobile application providers may have a variety of processes and/or schedules of updating and/or revising mobile applications. In addition, they may not consistently notify mobile service providers of version changes or may not do so in a timeframe appropriate for avoiding issues related to version synchronization. The system and method of this disclosure may provide a means for a mobile service provider to gain more control over version synchronization by using a version verification process to identify and address issues between the version of a mobile application the mobile service provider makes available to their customers and the version deemed appropriate by the originator of the mobile application.

In this disclosure, the term "re-download" may be used to indicate the act of downloading content that previously has been downloaded, but that may, for whatever reason, be downloaded again as directed by some indication, for example determining that a newer version of an application has been released. Also, the terms "version verification" and/or "version checking" may be used to describe the process of comparing more than one version of an application to see if they are the same. The term "out-of-sync" may be used in place of the term "out-of-synchronization", and may be used to indicate a condition in which more than one version of a mobile application may exist in a location or locations.

Currently, when a mobile application executes on a mobile device, the mobile application may contact the originator of the mobile application to verify that the mobile application installed on the mobile device is the proper version. If the mobile device does not have the proper version of the mobile application installed, the mobile application may cause the mobile device to contact the mobile service provider and re-download the mobile application. If, however, the mobile service provider does not have the proper version of the application, as designated by the originator of the mobile application, the mobile device may download a version of the mobile application that is still not the proper version. The mobile device may then execute the mobile application and again check with the originator of the mobile application to verify the version. If the version of the application that the mobile device has just downloaded still is not the proper version, according to the originator of the application, the mobile device may repeat the download process. If the version of the mobile application available from the mobile service provider and that of the originator of the mobile application are not the same, this re-download/verify/re-download loop may repeat indefinitely and may lead to problems with the mobile device and/or a negative user experience. There may be a variety of reasons why the mobile service provider may not have the most recent version of a mobile application available for download. For example, the mobile service provide may receive an update to a mobile application from the originator, but may delay availability of the updated version, pending testing or other verification, prior to making it available for distribution.

In an embodiment, a computer system may execute a mobile device emulation program to emulate a mobile device for testing and/or otherwise verifying mobile applications. The mobile device emulation program may access mobile device applications stored in a data store, an application store, a secondary computer storage device, or other storage media. The mobile device emulation program may execute a mobile application, which may then communicate with the originator of the mobile application to verify that the mobile application is the proper version. The originator of the mobile application may indicate that the mobile application is, in fact, the proper version. In this case, the mobile device emulation program may terminate the mobile application, log the results of the verification of the mobile application, and then execute the next mobile application to be verified. This process may repeat until all mobile applications to be verified have been executed, verified and/or tested, and logged appropriately.

In the event that the originator of the mobile application indicates that the mobile device emulation program does not have the proper version of the mobile application, or that there may be another indication of a problem with the mobile application, the mobile application may re-download the mobile application from the mobile service provider and execute the newly-downloaded mobile application. The newly-downloaded mobile application may then contact the originator of the mobile application to verify the mobile application. If the originator of the mobile application indicates that the mobile device still does not have the proper version of the mobile application, the mobile application may again re-download the application from the mobile device service provider. In this instance, the mobile device emulation program may detect that the mobile application has undergone successive re-downloads, which may indicate that the version of the mobile application located at the mobile service provider and the version of the mobile application located at the originator of the mobile application are not the same. This may indicate that an out-of-sync condition exists, with respect to the two different versions of the same mobile application at these two locations. In addition, this successive re-downloading of the mobile application may indicate some other form of problem with the mobile application that may require additional attention.

The mobile device emulation program may then terminate the mobile application, log the results, and move on to the next mobile application to be verified. This process may repeat until all mobile applications of the mobile service provider to be verified have been executed, verified and/or tested, and logged accordingly. In an embodiment, if the mobile device emulation program determines that a mobile application indicates an out-of-sync condition, the mobile device emulation program may alert an agent of the mobile service provider, who then may access the log, determine which mobile application or applications are not in sync with the mobile applications available from the originators of the mobile applications, and may attempt to remedy the issues. The mobile service provider may update, repair or replace the mobile applications, or obtain the proper versions of the mobile applications from the originators of the mobile applications. The mobile service provider may then make the proper version of the mobile applications available to customers of the mobile service provider. In an alternative embodiment, the emulation program may be configured to automatically obtain an updated version of an out-of-sync mobile application, and may then provide the updated version to the mobile service provider.

In another embodiment, a mobile service provider or an originator of a mobile application may elect to revert to another version of the mobile application, in order to avoid an out-of-sync condition while attempting to address the out-ofsync condition with the first mobile application. For example, if an originator of a mobile application releases a new or updated version of the mobile application and subsequently determines that there are problems, such as bugs, with the mobile application, the originator of the mobile application or the mobile service provider may remove the newer version of the mobile application from circulation and substitute an alternate, functioning version of the application into the mobile application distribution system. In this way, the end-users of the mobile application may continue to download and use the alternate version of the mobile application, without encountering the re-downloading problem, while the originator of the mobile application diagnoses and/or repairs the version of the mobile application that indicated an out-of-sync condition.

In an embodiment, measures to determine the usage, frequency-of-download, and/or frequency-of-update of mobile applications may be implemented and used to adapt the frequency of the verification process such that some mobile applications may be verified more frequently than others. For instance, if a particular mobile application has historically been revised frequently, or has proven to be prone to problems, it may be appropriate to conduct verification more often than for a mobile application that undergoes infrequent revisions or has proven to be robust. In an embodiment, the mobile service provider may define a schedule of testing and/or verifying some mobile applications more often than others in order to reduce issues relating to out-of-sync problems and/or other problems with mobile applications.

The duration of customer inconvenience also may be used to help determine the frequency of verification. For example, if a mobile application is setup for weekly verification, for instance on a Monday morning, but Monday afternoon the originator of mobile application releases a new version and fails to alert the mobile service provider of the new version, an out-of-sync condition may exist. The out-of-sync condition may cause the mobile device to experience successive re-downloads and/or to be unable to utilize the mobile application until after the next verification procedure is conducted and the out-of-sync condition is subsequently resolved. This could take a week or longer, based on the frequency of verification, plus the time required to resolve the out-of-sync condition. Alternatively, performing verification of the mobile application daily may reduce the duration of an out-of-sync condition and thereby reduce the associated negative experience for the mobile device user. These and other indications may be taken into consideration when determining an appropriate verification schedule for a mobile application or applications.

In an embodiment, an out-of-sync condition may be indicated based on successive re-downloads of a mobile application, wherein the frequency of the successive re-downloads may be one of minutes, hours, days, or other period, but wherein the period of successive re-downloads appropriately indicates that an out-of-sync condition or other problem with the mobile application exists. In an embodiment, the mobile device emulation program may be configured to emulate more than one mobile device in order to perform testing of mobile applications on a variety of mobile devices and/or other platforms, and may be configured to test one or more applications on each of the various platforms. A mobile service provider may have customers with more than one model or brand of mobile device, and so may configure the mobile device emulation program to emulate any/all devices supported by the mobile service provider. The mobile service provider may further configure the mobile emulation program to emulate each supported mobile device, and to then test any/all applications available to each mobile device to minimize the chances that a customer of the mobile service may experience a problem with an application on their particular mobile device.

In an embodiment, the process of verifying mobile applications as described above may be conducted periodically, such as monthly, weekly, daily, hourly, and/or multiples of these periods, as may be appropriate. In an embodiment, the verification process may be conducted on a non-periodic basis if, for instance, an out-of-sync condition is indicated or suspected. Other indications, such as an increase in the number of customer complaints about an application, may be an indication that conducting off-schedule verification is appropriate.

Figure 1:
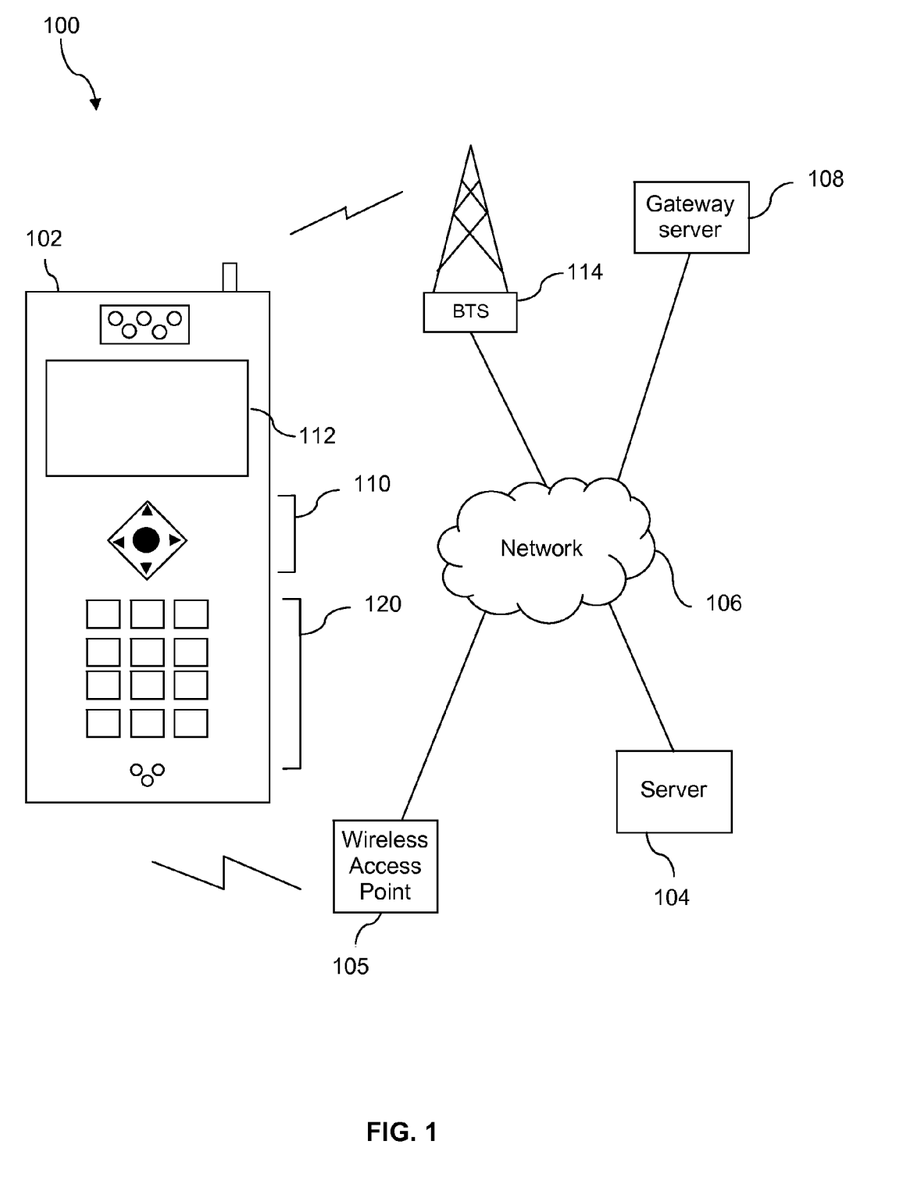
FIG. 1 illustrates an exemplary wireless communication system and mobile device suitable for implementing one or more embodiments of the disclosure.

Now turning to FIG. 1, a wireless communications system 100 including a mobile device 102 is shown. FIG. 1 depicts the mobile device 102, which is operable for implementing aspects of the present disclosure, but the present disclosure also may work with other implementations. Though illustrated as a mobile phone, mobile device 102 may take various forms including a wireless handset, a pager, a personal digital assistant (PDA), a gaming device, an inventory control device, a media player, a portable computer, a tablet computer, a laptop computer, and/or other. Many mobile devices 102 combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 112 and a touch-sensitive surface and/or keys 120 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 112 to show a web page. The web page may be obtained via wireless communications with a base transceiver station (BTS) 114, a wireless access point 105, a server 104, a gateway server 108, a peer mobile device 102 or any other wireless communication network or system. While a single base transceiver station 114 is illustrated, it is understood that the wireless communication system may comprise additional base transceiver stations. In some instances, the mobile device 102 may be in communication with multiple base transceiver stations 114 at the same time. The base transceiver station 114 (or wireless access point 105) is coupled to a wired network 106, such as the Internet. Via the wireless link and the wired network, the mobile device 102 has access to information on various servers, such as a server 104. The server 104 may provide content that may be shown on the display 112. Alternately, the mobile device 102 may access the base transceiver station 114 through a peer mobile device 102 acting as an intermediary, in a relay type or hop type of connection.

Figure 2:
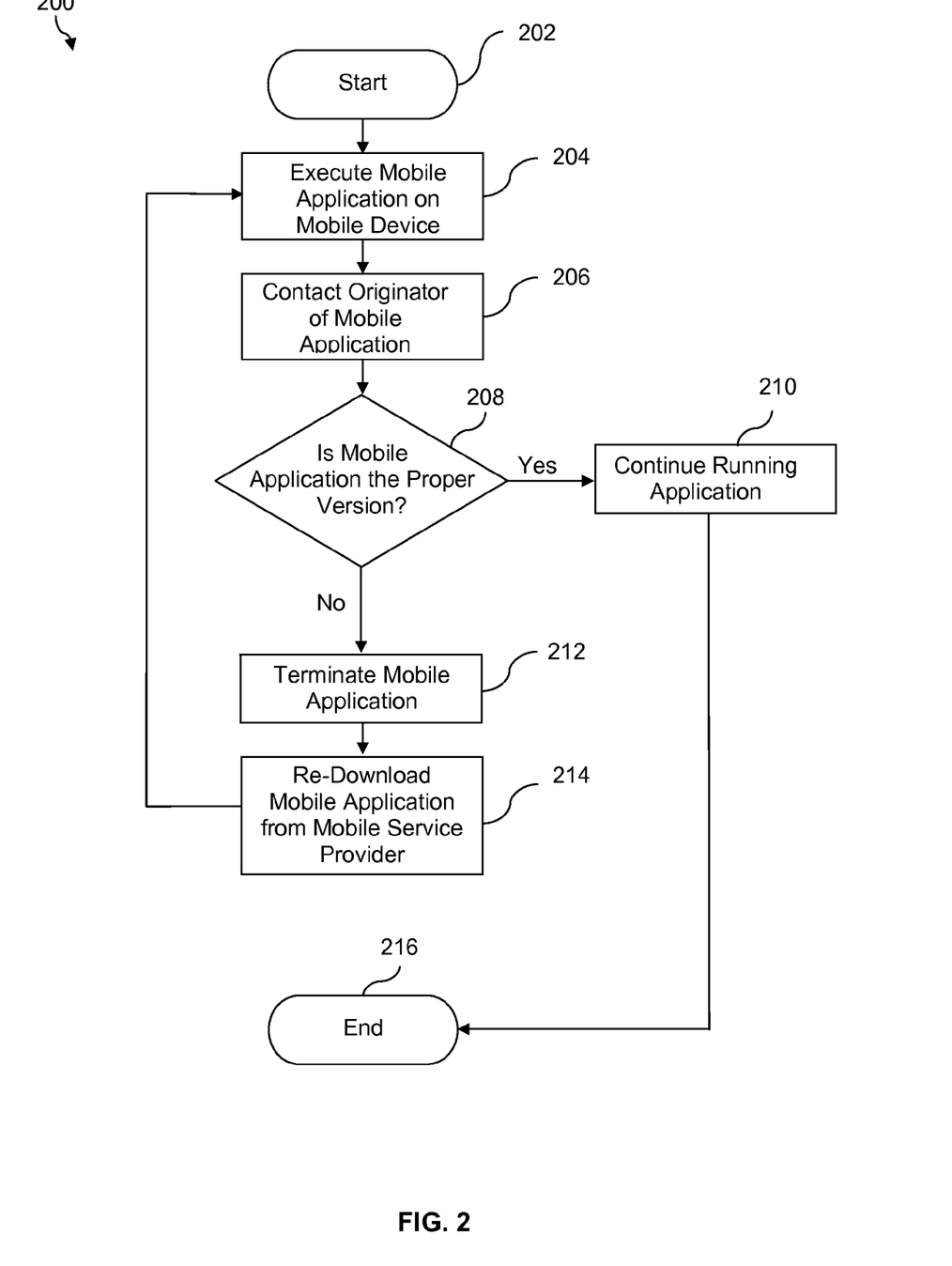
FIG. 2 illustrates a flow chart exemplary of an embodiment of the disclosure.

FIG. 2 illustrates a flowchart describing a current mobile application version checking process 200 on a mobile device 102. At block 202, the process starts. At block 204, mobile device 102 may execute an application. At block 206, the mobile application may contact the originator of the application. At block 208, the originator of the mobile application may check to see if the version of the mobile application installed on the mobile device is the proper version. If the originator of the application confirms that the version installed on the mobile device 102 is the proper version, process 200 may proceed to block 210. At block 210, the mobile device may continue running the mobile application until the mobile application is terminated. When the mobile application is terminated, process 200 may end at block 216.

If, however, at block 208 the originator of the mobile application indicates that the version of the application contained on the mobile device 102 is not the proper version, process 200 may proceed to block 212. At block 212, the mobile application may terminate. At block 214, the mobile application may re-download from the mobile service provider. Process 200 may then proceed to block 204. As before, process 200 again steps through the execution and version checking of the mobile application. If the mobile service provider does not have the proper version, as determined by the originator of the mobile device, and the mobile device has successively re-downloaded a version of the application that is not the proper version, process 200 may repeat indefinitely, which may lead to an error condition of the mobile device 102, which may in turn provide a negative user experience for the user of the mobile device 102.

Figure 3:
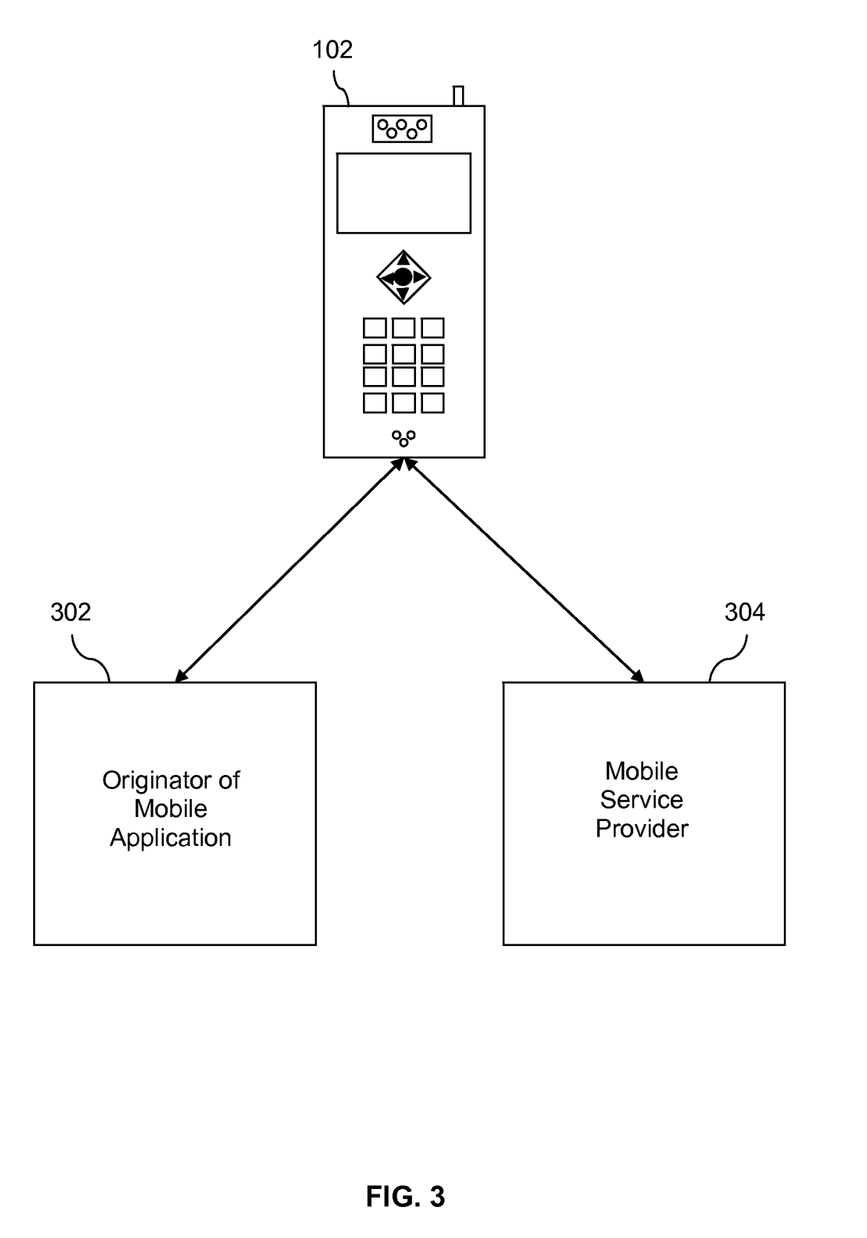
FIG. 3 illustrates communication paths exemplary of an embodiment of the disclosure.

FIG. 3 illustrates communication paths between a mobile device 102, an originator of a mobile application 302, and a mobile service provider 304. As shown in FIG. 3, an application of the mobile device 102 may communicate directly with the originator of the mobile application 302 to verify that the mobile device has the proper version of the application, as designated by the originator of the mobile application. If the originator of the mobile application 302 indicates that the mobile device 102 does not have the proper version of the application, the mobile device 102 may then communicate directly with the mobile service provider 304 to re-download the application. If, however, the mobile service provider 304 and the originator of the mobile application 302 do not have the same version of the mobile application, an out-of-sync condition may exist. This out-of-sync condition may lead to problems, such as successive re-downloading of the mobile application, when attempting to execute the out-of-sync mobile application on the mobile device 102.

Figure 4:
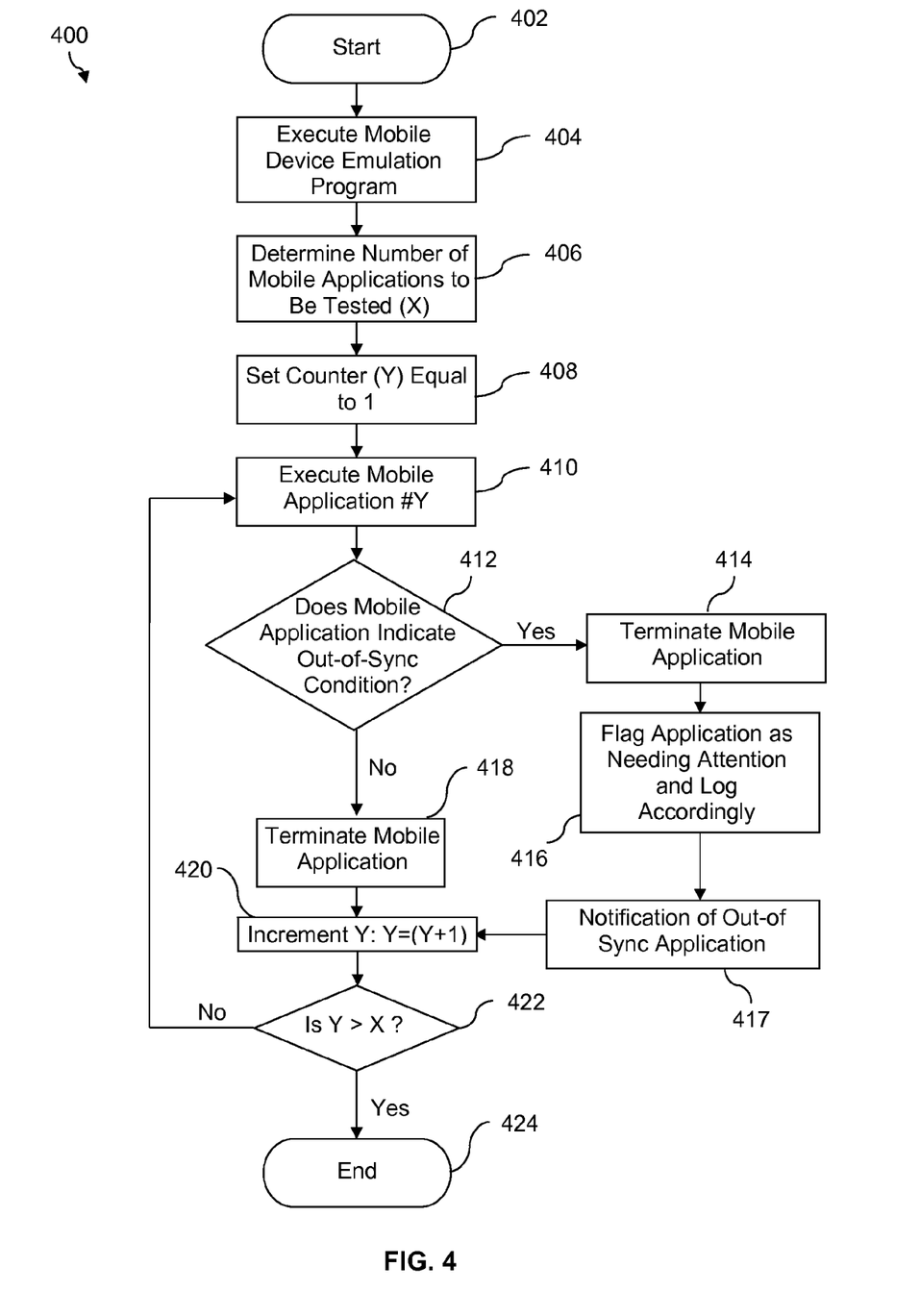
FIG. 4 illustrates a flow chart exemplary of an embodiment of the disclosure.

FIG. 4 illustrates a flowchart depicting the system and method 400 of the current disclosure. At block 402, method 400 starts. At block 404, a mobile device emulation program may be executed on a computer system. At block 406, the mobile device emulation program may determine the number (X) of mobile applications to be tested. At block 408, the mobile device emulation program may then set a counter (Y) to 1. At block 410, the mobile device emulation program may execute the mobile application to be verified.

At block 412, the mobile application, executing via the mobile device emulation program on a computer system, may contact the originator of the mobile application to determine whether or not an out-of-sync condition exists. If the provider of the mobile application indicates that the version of the mobile application being executed is not the proper version, the application may terminate the mobile application at block 414. At block 416, the mobile device emulation program may flag the application as needing attention and log it accordingly. At block 417, the mobile device emulation program may notify an agent of the mobile service provider of the out-of-sync condition. At block 420, the mobile device emulation program may increment the counter Y as Y=Y+1. At block 422, the mobile device emulation program determines if Y>X. If Y≦X, the mobile device emulation program may move to block 410 and continue the process by executing the next mobile application to be tested. If Y>X, process 400 may terminate at block 424. In an embodiment, the mobile device emulation program may be configured to detect a condition wherein the mobile application is not only out-of-sync, but that the mobile application is more than one version or revision behind the current mobile application. In this instance, a special notation may be made in the log so that an agent of the mobile service provider may take action to update the mobile application with intermediate versions and/or revisions, as necessary.

If, in block 412, the mobile application does not indicate an out-of-sync condition, process 400 may move to block 418. At block 418, the mobile device emulation program may terminate the mobile application. At block 420, the mobile device emulation program may increment the counter Y as Y=Y+1. At block 422, the mobile device emulation program may test to determine if Y>X. If Y>X, process 400 terminates at block 424. If Y≦X, the mobile device emulation program may move to block 410 and continue the process by executing the next mobile application to be verified. Process 400 may repeat until all mobile applications, 1 through X, have been executed, verified and/or tested appropriately, logged, and the mobile applications that indicate that they need attention have been flagged and an agent of the mobile service provider has been notified of any out-of-sync mobile applications.

Other methods of cycling through all of the mobile applications to be tested, other than the incremental counter described above, may be employed. One skilled in the art may be aware of methods for managing a list of tasks that may be employed in this scenario, and may choose a method that does so appropriately.

Figure 5:
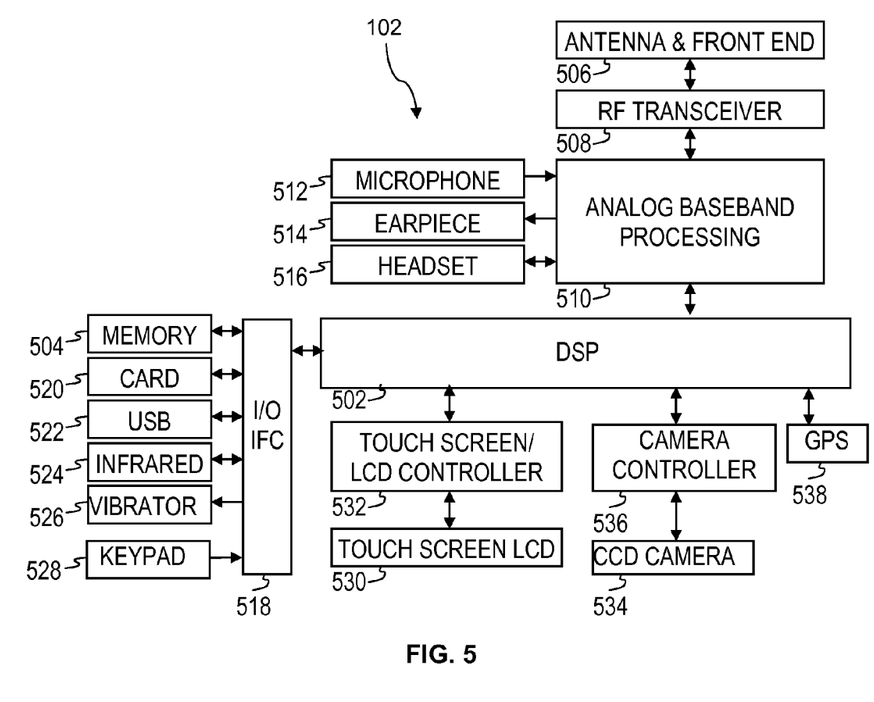
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency-shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
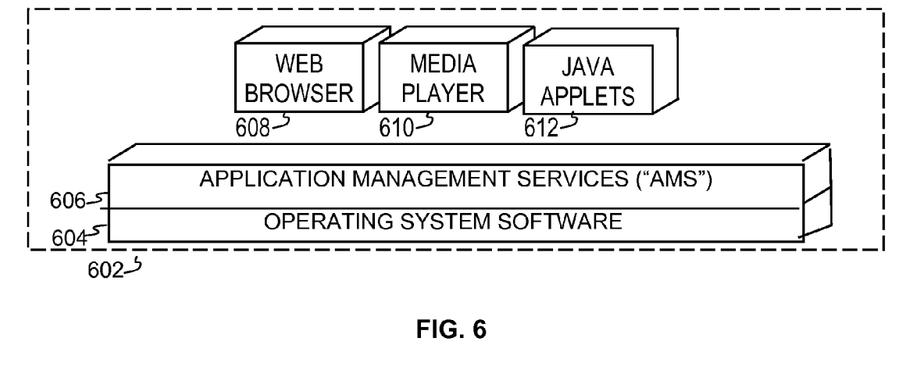
FIG. 6 is a block diagram of a software architecture of a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
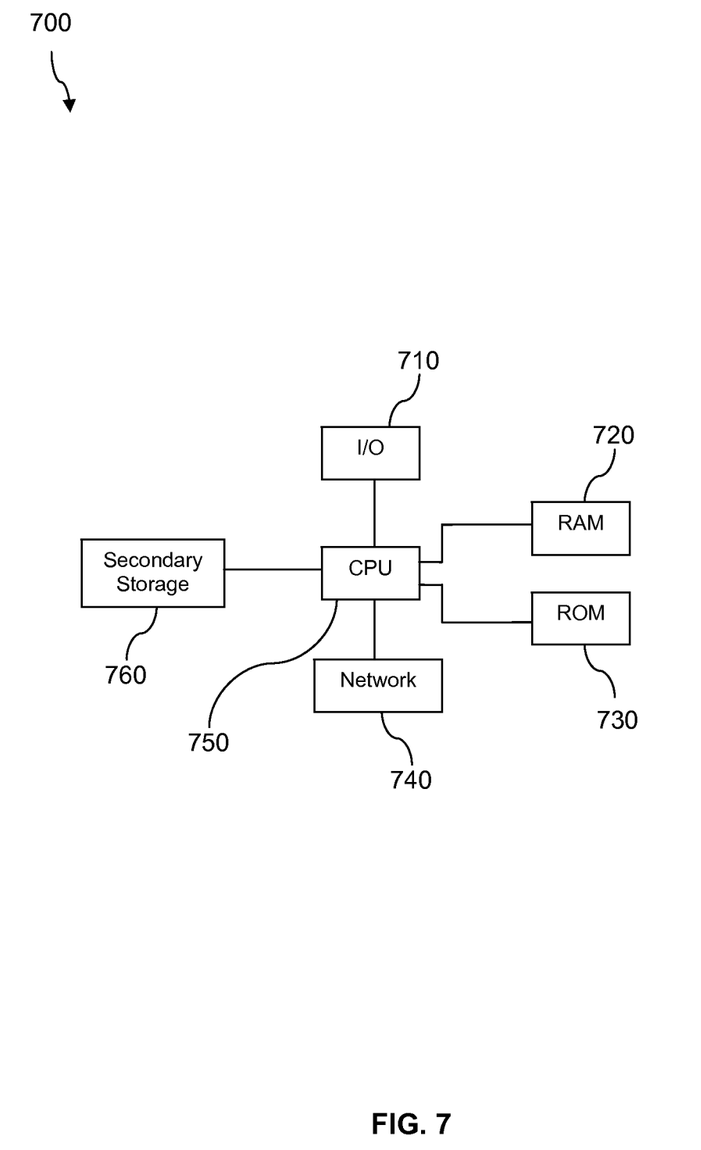
FIG. 7 illustrates an exemplary computer system suitable for implementing an embodiment of the disclosure.

FIG. 7 illustrates a computer system 700 suitable for implementing one or more embodiments disclosed herein. The computer system 700 includes a processor 750 (which may be referred to as a central processor unit or CPU) that is in communication with memory devices including secondary storage 760, read only memory (ROM) 730, random access memory (RAM) 720, input/output (I/O) devices 710, and network connectivity devices 740. The processor 750 may be implemented as one or more CPU chips.

It is understood that by programming and/or loading executable instructions onto the computer system 700, at least one of the CPU 750, the RAM 720, and the ROM 730 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 760 is typically comprised of one or more disk drives or tape drives and is used for non-volatile storage of data and as an over-flow data storage device if RAM 720 is not large enough to hold all working data. Secondary storage 760 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage 760. The RAM 720 is used to store volatile data and perhaps to store instructions. Access to both ROM 730 and RAM 720 is typically faster than to secondary storage 760.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 740 may enable the processor 750 to communicate with an Internet or one or more intranets. With such a network connection, it is contemplated that the processor 750 might receive information from the network, or might output information to the network in the course of performing the above-described method steps. Such information, which is often represented as a sequence of instructions to be executed using processor 750, may be received from and outputted to the network, for example, in the form of a computer data signal embodied in a carrier wave.

Such information, which may include data or instructions to be executed using processor 750 for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 750 executes instructions, codes, computer programs, scripts which it accesses from hard disk, floppy disk, optical disk (these various disk based systems may all be considered secondary storage 760), ROM 730, RAM 720, or the network connectivity devices 740. While only one processor 750 is shown, multiple processors may be present. Thus, while instructions may be discussed as executed by a processor, the instructions may be executed simultaneously, serially, or otherwise executed by one or multiple processors.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 760, to the ROM 730, to the RAM 720, and/or to other non-volatile memory and volatile memory of the computer system 700. The processor 750 may process the executable instructions and/or data in part by directly accessing the computer program product, for example by reading from a CD-ROM disk inserted into a disk drive peripheral of the computer system 700. The computer program product may comprise instructions that promote the loading and/or copying of data, data structures, files, and/or executable instructions to the secondary storage 760, to the ROM 730, to the RAM 720, and/or to other non-volatile memory and volatile memory of the computer system 700.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of identifying a problem with a mobile application, comprising:
    initiating, by an emulation application, execution of a mobile application downloaded to an emulation application store from a data store associated with a mobile service provider, the emulation application providing an execution environment that simulates a portable communication device in which the mobile application executes, wherein the emulation application is stored in a memory and executed by a processor of a computer;
    determining, by the emulation application, that an originator mobile application stored with an originator and the mobile application are out of version synchronization by detecting that the mobile application has re-downloaded to the emulation application store from the data store twice in succession, wherein detecting that the mobile application has re-downloaded to the emulation application store from the data store twice in succession comprises:
        verifying with the originator a first time whether the mobile application executed by the emulator application is the same version as the originator mobile application,
        re-downloading the mobile application to the emulation application store from the data store a first time in response to verifying the first time that the mobile application executed by the emulator application is not the same version as the originator mobile application,
        after re-downloading the mobile application from the data store the first time, verifying with the originator a second time whether the mobile application executed by the emulator application is the same version as the originator mobile application, and
        re-downloading the mobile application a second time to the emulation application store from the data store in response to verifying the second time that the mobile application executed by the emulator application is not the same version as the originator mobile application; and
    transmitting, by the emulation application, a notification that the mobile application has re-downloaded twice in succession to the emulation application store based on the detection of successive re-downloads.

2. The method of claim 1, wherein the emulation application provides an execution environment simulating an execution environment of one of a mobile phone, a personal digital assistant (PDA), a media player, a laptop computer, a notebook computer, and a tablet computer.

3. The method of claim 1, wherein the mobile application self-reinstalls at the command of a sourcing point of the mobile application operated in association with an organization that developed the mobile application.

4. The method of claim 1, further comprising communicating, by an administrator, with an organization that developed the mobile application to overcome a mobile application problem.

5. The method of claim 1, wherein the mobile application is an open source application provided by a third party and further comprising contacting, by an administrator, the third party to resolve a mobile application problem.

6. The method of claim 1, further comprising the application store downloading the proper version of the mobile application.

7. The method of claim 1, wherein re-downloading comprises re-executing the mobile application by the emulation application.

8. The method of claim 1, wherein the originator mobile application is a more recently updated version than the mobile application.

9. A system of identifying outdated mobile applications, comprising:
    a computer having a memory and a processor;
    a data store associated with a mobile service provider containing a plurality of mobile applications, each of the plurality of mobile applications is associated with an originator of the corresponding mobile application; and
    an application stored in the memory that, when executed by the processor:
        emulates an execution environment of a portable communication device,
        executes a mobile application of the plurality of mobile applications in the emulated execution environment of the portable communication device, the mobile application downloaded from the data store,
        determines that an originator mobile application stored with an originator and the mobile application are out of version synchronization by detecting that the mobile application has re-downloaded from the data store two times successively, wherein detecting that the mobile application has re-downloaded from the data store two times successively comprises:
            verifying with the originator a first time whether the mobile application executed by the application is the same version as the originator mobile application,
            re-downloading the mobile application from the data store a first time in response to verifying the first time that the mobile application executed by the application is not the same version as the originator mobile application,
            after re-downloading the mobile application from the data store the first time, verifying with the originator a second time whether the mobile application executed by the application is the same version as the originator mobile application, and
            re-downloading the mobile application from the data store a second time in response to verifying the second time that the mobile application executed by the application is not the same version as the originator mobile application, and transmits a notification to an administrator associated with the data store indicating that the mobile application executed by the application has re-downloaded from the data store two times successively, and that the mobile application stored in the data store and the originator mobile application are out of version synchronization.

10. The system of claim 9, wherein the data store comprises an application store.

11. The system of claim 9, wherein at least some of the mobile applications are open source applications.

12. The system of claim 9, wherein the originator of the mobile application of the plurality of mobile applications is a third party.

13. The system of claim 9, wherein the application periodically executes at least one mobile application of the plurality of mobile applications.

14. The system of claim 13, wherein the application executes at least one mobile application of the plurality of mobile applications at a periodic rate of about once per hour, about once per day, about once per week, and about once per month.

15. The system of claim 13, wherein the application executes a selection of the mobile applications of the plurality of mobile applications more frequently than the remainder of the plurality of mobile applications, wherein the selection of mobile applications each downloads a database of information on initialization.

16. The system of claim 9, wherein the application emulates an execution environment of one of a mobile phone, a personal digital assistant (PDA), a media player, and a laptop computer.

17. The system of claim 9, wherein the computer is coupled to a plurality of originators of the mobile applications via a network connection.

18. A system of identifying outdated mobile applications, comprising:

a computer having a memory and a processor;

a data store associated with a mobile service provider containing a plurality of mobile applications, each of the plurality of mobile applications is associated with an originator of the corresponding mobile application; and a plurality of applications stored in the memory, wherein each application, when executed by the processor:

emulates an execution environment of a different portable communication device, executes at least a mobile application of the plurality of mobile applications in the emulated execution environment of the portable communication device, the mobile application downloaded from the data store, determines that an originator mobile application stored with an originator and the mobile application are out of version synchronization by detecting that the mobile application re-downloads from the data store two times successively, wherein detecting that the mobile application has re-downloaded two times successively comprises:

verifying with the originator a first time whether the mobile application executed by the application is the same version as the originator mobile application, re-downloading the mobile application from the data store a first time in response to verifying the first time that the mobile application executed by the application is not the same version as the originator mobile application, after re-downloading the mobile application from the data store the first time, verifying with the originator a second time whether the mobile application executed by the application is the same version as the originator mobile application, and re-downloading the mobile application from the data store a second time in response to verifying the second time that the mobile application executed by the application is not the same version as the originator mobile application, and transmits a notification to an administrator associated with the data store indicating that the mobile application re-downloaded two times successively, and that the mobile application stored in the data store and the originator mobile application are out of version synchronization.

19. The system of claim 18, wherein a first application emulates a smart phone and a second application emulates a second generation phone.

20. The system of claim 18, wherein the portable communications devices emulated by the applications comprise at least one of a mobile phone, a personal digital assistant, a media player, a notebook computer, a laptop computer, and a tablet computer.

\* \* \* \* \*